US009380510B2

(12) United States Patent  (10) Patent No.: US 9,380,510 B2
Kim  (45) Date of Patent: Jun. 28, 2016

(54) APPARATUS AND METHOD FOR PROCESSING GTP IN MOBILE COMMUNICATION SYSTEM

(75) Inventor: Oh-Hyun Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1072 days.

(21) Appl. No.: 12/691,203

(22) Filed: Jan. 21, 2010

(65) Prior Publication Data

US 2010/0189076 A1    Jul. 29, 2010

(30) Foreign Application Priority Data

Jan. 23, 2009  (KR) .................. 10-2009-0006103

(51) Int. Cl.
*H04W 36/00* (2009.01)
*H04W 40/00* (2009.01)
*H04W 36/38* (2009.01)
*H04W 4/00* (2009.01)

(52) U.S. Cl.
CPC ................... *H04W 36/385* (2013.01)

(58) Field of Classification Search
CPC ........................ H04W 36/00; H04W 36/385
USPC .................................. 370/331, 328
See application file for complete search history.

(56) References Cited

U.S. PATENT DOCUMENTS

| 2003/0007490 A1* | 1/2003 | Yi ........................ H04L 1/18 370/394 |
| 2003/0123485 A1* | 7/2003 | Yi ........................ H04W 28/06 370/477 |
| 2008/0188223 A1* | 8/2008 | Vesterinen ........... H04W 36/02 455/436 |
| 2008/0310368 A1 | 12/2008 | Fischer |
| 2009/0061876 A1* | 3/2009 | Ho ........................ H04W 99/00 455/436 |
| 2009/0086677 A1* | 4/2009 | Ho ................................ 370/331 |
| 2009/0109924 A1* | 4/2009 | Sato ............................ 370/331 |
| 2009/0131053 A1* | 5/2009 | Sachs ............... H04W 36/0016 455/436 |

(Continued)

FOREIGN PATENT DOCUMENTS

KR    10-2007-0096968 A    10/2007

OTHER PUBLICATIONS

Ulupinar et al.; Cell Relay Base Station for LTE, Oct. 24, 2008, U.S. Appl. No. 61/108,287, pp. 1-20.*

*Primary Examiner* — Guang Li
*Assistant Examiner* — Faisal Choudhury
(74) *Attorney, Agent, or Firm* — Jefferson IP Law, LLP

(57) ABSTRACT

A system for processing General Packet Radio Service (GPRS) Tunneling Protocol (GTP) for a handover in a mobile communication system is provided. The system includes an Evolved Packet Core (EPC), a source base station, and a target base station. The EPC transmits an end data indication message to a source base station of a user terminal to inform of an update for a user plane when receiving an update request message for the user plane of the user terminal from the target base station. The source base station forwards the remaining data destined for the user terminal to the target base station when receiving the end data indication message from the EPC, and transmits the end data indication message to the target base station upon completion of the forwarding. The target base station transmits data destined for the user terminal and stored in a buffer to the user terminal when receiving the end data indication message from the source base station, and releases resources set for the forwarding with the source base station upon completion of the data transmission to the user terminal.

18 Claims, 9 Drawing Sheets

(56) References Cited

U.S. PATENT DOCUMENTS

| | | | |
|---|---|---|---|
| 2009/0141684 A1* | 6/2009 | Hashimoto | H04W 36/02 370/331 |
| 2009/0190554 A1* | 7/2009 | Cho | 370/331 |
| 2009/0245201 A1* | 10/2009 | Motegi et al. | 370/331 |
| 2009/0253434 A1* | 10/2009 | Hayashi et al. | 455/436 |
| 2009/0303963 A1* | 12/2009 | Bosch et al. | 370/331 |
| 2010/0035616 A1* | 2/2010 | Sebire | 455/436 |
| 2010/0091734 A1* | 4/2010 | Park | H04W 92/20 370/331 |
| 2010/0103865 A1* | 4/2010 | Ulupinar | H04L 29/12207 370/315 |
| 2010/0120430 A1* | 5/2010 | Hayashi | 455/436 |
| 2010/0177739 A1* | 7/2010 | Huang | 370/331 |
| 2010/0178920 A1* | 7/2010 | Kitazoe et al. | 455/436 |
| 2010/0189076 A1* | 7/2010 | Kim | 370/331 |
| 2010/0195621 A1* | 8/2010 | Kekki | H04W 48/17 370/332 |
| 2010/0232391 A1* | 9/2010 | Olsson et al. | 370/331 |
| 2010/0272006 A1* | 10/2010 | Bertrand | H04B 7/2606 370/315 |
| 2011/0044279 A1* | 2/2011 | Johansson et al. | 370/329 |
| 2011/0044290 A1* | 2/2011 | Kanazawa | 370/332 |

* cited by examiner

APPARATUS AND METHOD FOR PROCESSING GTP IN MOBILE COMMUNICATION SYSTEM

PRIORITY

This application claims the benefit under 35 U.S.C. §119(a) of a Korean patent application filed in the Korean Intellectual Property Office on Jan. 23, 2009 and assigned Ser. No. 10-2009-0006103, the entire disclosure of which is hereby incorporated by reference.

BACKGROUND OF THE INVENTION

1. Field of the Invention

The present invention relates to communications systems. More particularly, the present invention relates to an apparatus and method for processing a General Packet Radio Service (GPRS) Tunneling Protocol (GTP) for lossless and sequential transmission of packet data on a user plane for a handover of a wireless mobile terminal (hereinafter referred to as a user terminal) in a $3^{rd}$ Generation Partnership Project (3GPP) Long Term Evolution (LTE) system.

2. Description of the Related Art

Unlike the Universal Mobile Telecommunications System (UMTS) of the related art, the 3GPP LTE system does not include a Radio Network Controller (RNC) and has a simple network structure including a user terminal, an evolved Node B (eNB) (hereafter referred to as a base station), and an Evolved Packet Core (EPC).

According to the simplified network structure, the GTP used for transmission and reception on a user plane between the core network device (e.g., Mobile Switching Center (MSC)) and a Radio Network Subsystem (RNS) of the 3GPP LTE system is handed down to a base station, so that the base station and the EPC interface through the GTP.

The LTE system provides a packet data service that transmits voice through the Voice over Internet Protocol (VoIP) without dividing transmission/reception processing of voice and data.

FIG. 1 is a diagram illustrating a structure of an LTE system according to the related art.

Referring to FIG. 1, in the LTE system, user terminals 110 and 120 are allocated unique IP addresses from a Mobility Management Entity (MME) of an EPC 160 to receive services. Each of the terminals 110 and 120 provides VoIP, VOD, FTP and Web browsing services to a user.

A Radio Bearer (RB) is allocated for each service between the user terminals 110 and 120 and base stations 130 and 140, and GTP Tunnel IDentifiers (IDs) are allocated respectively between the EPC 160 and the base stations 130 and 140. The EPC 160 may manage the user terminals 110 and 120 through other nodes 150, 170, 180 and 190, and may be connected to another network through a Packet Data Network (PDN) 195.

In the LTE system, a user terminal sets a default bearer through an attach process with an access network in an initial power-on mode. The user terminal sets each dedicated bearer whenever triggering each service.

A Dedicated Radio Bearer (DRB) is allocated through a Radio Resource Control (RRC) connection process between the user terminal and the base station, and a Tunnel Endpoint ID (TEID) is allocated through a context setup process between the base station and the MME to set an S1-U bearer.

Thereafter, an SAE bearer (i.e., a user traffic path) is set between the user terminal and the EPC 160 to communicate user data between the user terminal and the EPC 160. In the case of uplink data, the base station deciphers and decompresses user data, received through PHYsical (PHY), Media Access Control (MAC) and Radio Link Control (RLC) layers, by a Packet Data Control Protocol (PDCP) and transfers the resulting data to the GTP that is an upper layer.

The GTP encodes and transmits a GTP-U header including a TEID allocated at the call setup for a received Packet Data Unit (PDU). Herein, the TEID represents a destination TEID that is mapped using a traffic handling table generated at the call setup and call information (e.g., Radio Bearer ID (RBID) and Direction Indicator) received from the PDCP.

In the case of downlink transmission from the EPC, a TEID is extracted from a received GTP-U PDU, RBID and other information for processing in the base station are acquired from the traffic handing table, and an internal message is generated and transferred to the PDCP layer (the base station manages the mapping structure between the RBID and the TEID).

The PDCP layer allocates a PDCP Sequence Number (SN) for the PDU received from the GTP, compresses/ciphers an IP header in the PDU, and transfers the results to the user terminal through the RLC/MAC/PHY layer.

In a basic process for a handover between representative base stations in the LTE system, a source base station receives a measurement report message from the user terminal to determine whether to perform a handover.

In the case of RLC Acknowledged Mode (AM), if it is determined that preparation for a handover to a target base station ends, a source base station starts data forwarding and transfers a PDCP SN, allocated and used in the PDCP layer of a base station, through an SN Status Transfer message. The first PDCP SN failing to be received from the user terminal is transferred in the case of uplink transmission, and the next SN of the last allocated PDCP SN in the PDCP layer is transferred in the case of downlink transmission. The target base station buffers packets received from the source base station.

If it is determined that the handover to the target base station is completed, the target base station transfers a path switch request to the EPC so that the EPC transfers downlink user data to the target base station without transmitting the same to the source base station.

When receiving all the packet data forwarded from the source base station, the PDCP layer of the target base station re-orders the buffered packets by the PDCP SN and transmits results to the user terminal. Also, data newly received from the EPC are allocated a PDCP SN with reference to the PDCP SN of SN Status Transfer, and are received from the source base station, prior to transmission to the user terminal.

In a switch downlink path process during the handover process, the EPC should inform that there is no more transmission of user data to the source base station. Also, the source base station should inform of the completion of data forwarding to the target base station.

If the EPC does not inform the source base station that there is no more transmission of user data and the source base station does not inform the target base station of the completion of data forwarding, the PDCP layer of the source base station endlessly waits for packets from the EPC and the PDCP layer of the target base station endlessly waits for packets from the source base station.

That is, for a handover, the PDCP layer of the base station processes data to be forwarded and should know the last forward data. If not, the PDCP layer waits for data reception endlessly or waits for data reception during a timer operation period, which may cause a loss or delay of user data.

Therefore, a need exists for an apparatus and method for efficient traffic transmission between base stations and between a base station and an EPC.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for processing General Packet Radio Service (GPRS) Tunneling Protocol (GTP) in a mobile communication system.

Another object of the present invention is to provide an apparatus and method for performing an End Indication process for informing of the completion of user data transmission in order to provide an efficient handover operation between base stations and between a base station and an Evolved Packet Core (EPC) in a mobile communication system.

Another object of the present invention is to provide an apparatus and method for efficient user traffic transmission between base stations and between a base station and an EPC in a mobile communication system.

In accordance with an aspect of the present invention, a system for processing GTP for a handover in a mobile communication system is provided. The system includes an EPC for transmitting an end data indication message to a source base station of a user terminal to inform of an update for a user plane, when receiving an update request message for the user plane of the user terminal from a target base station, a source base station for forwarding the remaining data destined for the user terminal to the target base station, when receiving the end data indication message from the EPC, and for transmitting the end data indication message to the target base station upon completion of the forwarding, and the target base station for transmitting data destined for the user terminal and stored in a buffer to the user terminal, when receiving the end data indication message from the source base station, and for releasing resources set for the forwarding with the source base station upon completion of the data transmission to the user terminal.

In accordance with another aspect of the present invention, a method for processing GTP for a handover in a mobile communication system is provided. The method includes a first operation for transmitting, by a EPC, an end data indication message from an EPC to a source base station of the user terminal to inform of an update for the user plane when receiving an update request message for a user plane of a user terminal from a target base station, a second operation for forwarding, by the source base station, the remaining data destined for the user terminal to the target base station, when receiving the end data indication message from the EPC, and for transmitting the end data indication message to the target base station upon completion of the forwarding, and a third operation for transmitting, by the target base station, data destined for the user terminal and stored in a buffer to the user terminal, when receiving the end data indication message from the source base station, and for releasing resources set for the forwarding with the source base station upon completion of the data transmission to the user terminal.

In accordance with still another aspect of the present invention, an apparatus of a base station for uplink or downlink transmission in a GTP layer of a mobile communication system is provided. The apparatus includes a control unit for acquiring identification information on a wireless link with respect to a packet received on a wireless link, for acquiring identification information on a wired link mapped to the identification information on the wireless link and transmitting a packet to an opponent node using the identification information on the wired link, or for acquiring identification information on a wired link with respect to a packet received on a wired link, for acquiring identification information on a wireless link mapped to the identification information on the wired link and for transmitting a packet to an opponent node using the identification information on the wireless link, and a storage unit for storing a traffic handling table including the identification information on the wireless link and the identification information on the wired link.

In accordance with yet another aspect of the present invention, a method for uplink or downlink transmission in a GTP layer of a mobile communication system is provided. The method includes a first operation for acquiring, by a control unit, identification information on a wireless link with respect to a packet received on a wireless link, for acquiring identification information on a wired link mapped to the identification information on the wireless link and for transmitting a packet to an opponent node using the identification information on the wired link, a second operation for acquiring, by the control unit, identification information on a wired link with respect to a packet received on a wired link, for acquiring identification information on a wireless link mapped to the identification information on the wired link and for transmitting a packet to an opponent node using the identification information on the wireless link, and a third operation for storing, by a storage unit, a traffic handling table including the identification information on the wireless link and the identification information on the wired link.

Other aspects, advantages, and salient features of the invention will become apparent to those skilled in the art from the following detailed description, which, taken in conjunction with the annexed drawings, discloses exemplary embodiments of the invention

BRIEF DESCRIPTION OF THE DRAWINGS

The above and other aspects, features, and advantages of certain exemplary embodiments of the present invention will become more apparent from the following description taken in conjunction with the accompanying drawings, in which.

DETAILED DESCRIPTION OF THE EXEMPLARY EMBODIMENTS

Figure 1:
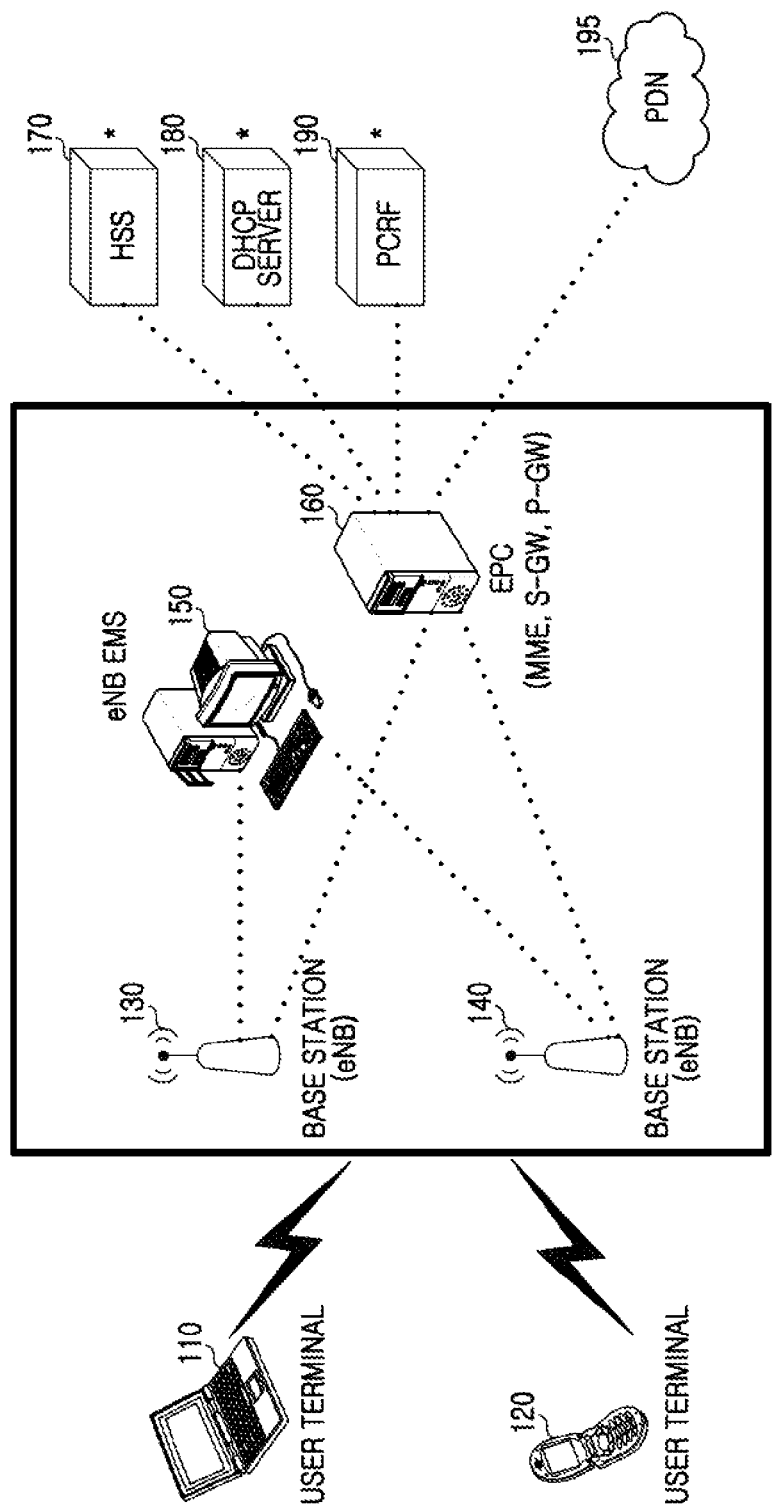
FIG. 1 is a diagram illustrating a structure of a Long Term Evolution (LTE) system according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide an apparatus and method for processing General Packet Radio Service (GPRS) Tunneling Protocol (GTP) in a mobile communication system.

In a Long Term Evolution (LTE) system including a user terminal, a base station and an Evolved Packet Core (EPC), the base station has a Packet Data Control Protocol (PDCP) layer that performs PDCP Sequence Number (SN) allocation, Internet Protocol (IP) header compression and ciphering operations.

In a handover operation, the PDCP layer processes data to be forwarded and needs to know the last forward data. If not, the PDCP layer waits for data reception endlessly or waits for data reception during a timer operation period, which may cause a loss or delay of user data.

Thus, an end indication should be used for informing of the last data and to additionally define a GTP-U protocol message type for processing the end indication. A message type usable as an end indication may be defined in the GTP version 1 standard and the GTP version 2 standard, which is an LTE dedicated standard.

Thus, an effective reserved message type of a GTP_U message may be used for an end indication to efficiently transmit user data without a packet loss in a handover process in the LTE system.

A 254 message type, among "for future use" fields of another class among a GTP message type, may be defined and used as a GTP_U end indication. GTP_U end indication message type transmission does not include other Packet Data Units (PDUs) except a GTP header.

Figure 2:
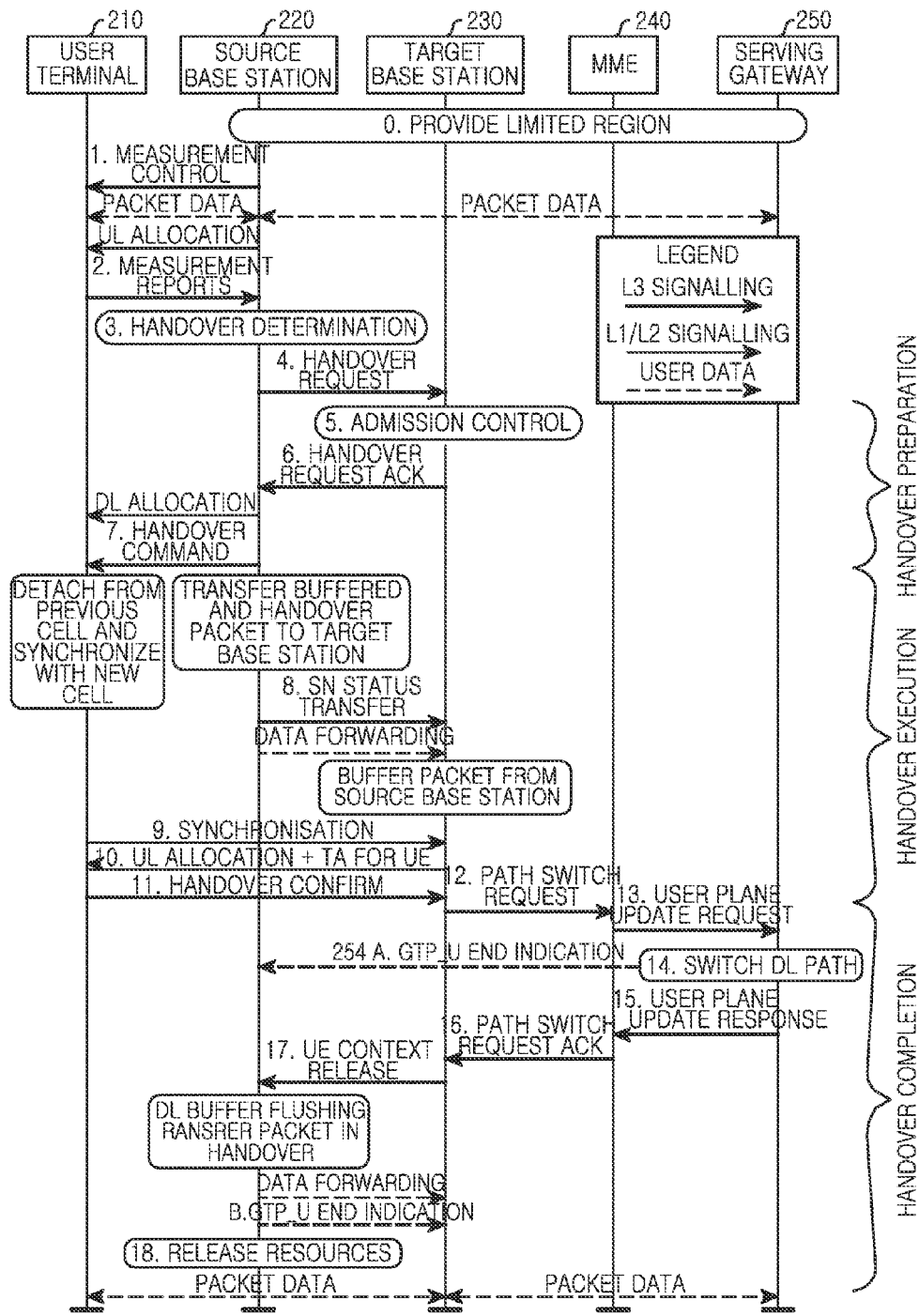
FIG. 2 is a flow diagram illustrating a handover process using a General Packet Radio Service (GPRS) Tunneling Protocol (GTP)_U end indication message type according to an exemplary embodiment of the present invention.

FIG. 2 is a flow diagram illustrating a handover process using a GTP_U end indication (254) message type according to an exemplary embodiment of the present invention.

Referring to FIG. 2, when a handover from a source base station 220 to a target base station 230 is completed (e.g., when the target base station 230 receives a handover confirm massage from a user terminal 210) in steps 1~11, the target base station 230 transmits a pass switch request message to an Mobility Management Entity (MME) 240 in step 12.

When receiving the pass switch request message, the MME 240 informs a serving gateway 250 of a user plane update request message in (step 13). Thereafter, the serving gateway 250 does not transmit user data to the source base station 220 anymore and transmits a GTP_U end indication (254) message to the source base station 220 to inform of this in step 14. Also, the serving gateway 250 transmits a related control message (a user plane update response message) to the MME 240 in step 15.

Thereafter, the MME 240 transmits a response message for the received path switch request message to the target base station 230 in step 16. Hereinafter, the MME 240 and the serving gateway 250 will be referred as a network or a node called the above EPC.

When receiving the GTP_U end indication message in step 14, a GTP layer of the source base station 220 transfers a data end request message to a PDCP layer of the source base station 220 to inform of no more transmission of user data.

Herein, the transferred information includes a Direction Indicator (0), a PDCP SN, and a Call IDentifier (CallID), a Radio Bearer ID (RBID) corresponding to a Tunnel Endpoint ID (TEID) among tunnel information set for a handover except a PDU received by the GTP layer, the uses of which will be described below.

The RBID includes a Radio Bearer ID allocated at an initial call setup in a Uu period that is an air interface allocated between the user terminal 210 and the source base station 220. The Direction Indicator includes information indicating the occurrence/nonoccurrence of a handover, where '0' indicates a S1-U basic call and '1' and '2' are information used in a handover which indicates downlink forwarding and uplink forwarding. When a GTP_U end indication from the EPC, the S1-U is set to '0'. The PDCP SN includes a sequence number that is transferred in a handover and is allocated in the PDCP layer of the source base station 220, and in the case of a S1-U basic call, it may be set to 0xffff and may be transferred to the PDCP layer of the target base station 230.

In a handover process, the PDCP layer of the source base station 220 performing data forwarding receives a data end request message indicating the last data from the GTP layer of the source base station 220, receives a PDCP buffer flush indication message from a control block in step 17, and transmits a data end indication message indicating no more forward data to the GTP layer of the source base station 220 (PDCP SN: 0xFFFF, Direction Indicator (1 or 2)) to perform a PDCP internal resource recovery process.

Thereafter, the PDCP layer of the source base station 220 performs sequential forwarding through a GTP layer with respect to data among user data received from the EPC, which have not been transmitted to the user terminal 210 (in the case of a Radio Link Control (RLC) Acknowledged Mode (AM) mode, data whose ACKnowledgement (ACK) is not received from the user terminal 210, and it may be detected by a PDCP SN in the PDCP layer of the source base station 220) and are stored in a buffer, and data that were received from the EPC and have not yet been transmitted to the user terminal 210 (sequential PDCP SN and Direction Indicator (1 or 2)).

The GTP layer of the source base station 220, which has received the data end indication message from the PDCP layer of the source base station 220, constructs a GTP header using a GTP_U end indication message type and transmits the same to the target base station 230. Herein, a GTP PDU is not included.

When receiving a GTP_U end indication message, the GTP layer of the target base station 230 transmits a data end indication message to the PDCP layer of the target base station 230 to inform of no more forward data. In step 18, the source base station 220 can be released.

Thereafter, the PDCP layer of the target base station 230 re-orders data received/forwarded in a buffer until the reception of the data end indication message on the basis of a PDCP SN, and transmits the re-ordered data through an RLC layer to the user terminal 210.

At the same time, the PDCP layer of the target base station 230 transmits a data forwarding end indication message to a call control block to inform of the completion of a data forwarding process, and deletes a GTP Tunnel ID (X2) generated for the data forwarding.

Figure 3:
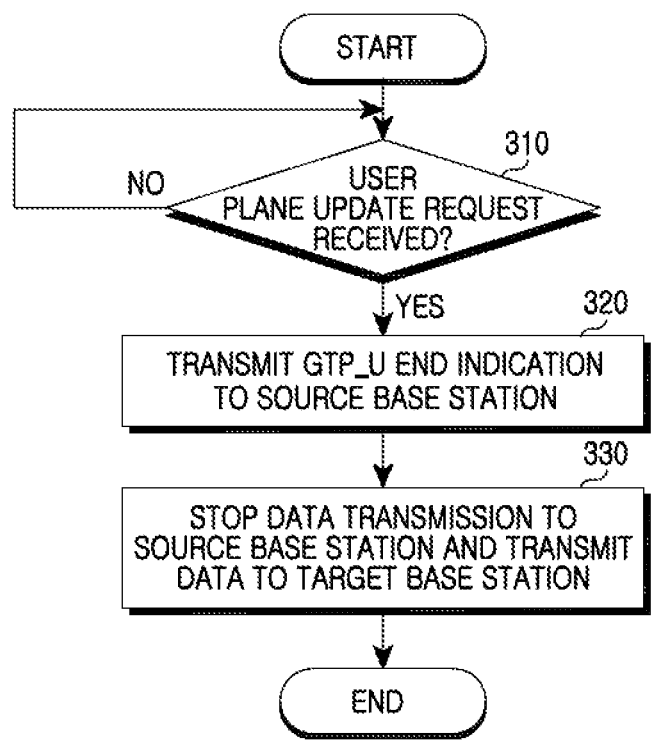
FIG. 3 is a flowchart illustrating an operation process of a serving gateway according to an exemplary embodiment of the present invention.

FIG. 3 is a flowchart illustrating an operation process of a serving gateway according to an exemplary embodiment of the present invention.

Referring to FIG. 3, when a handover of a user terminal from a source base station to a target base station is completed, the target base station transmits a pass switch request message to an MME. When receiving the pass switch request message, the MME transmits a user plane update request message to a serving gateway.

When receiving the user plane update request message in step 310, the serving gateway transmits a GTP_U end indication message to the source base station to inform of this in step 320.

The serving gateway does not transmit user data to the source base station anymore and transmits user data of the user terminal to the target base station in step 330.

Figure 4:
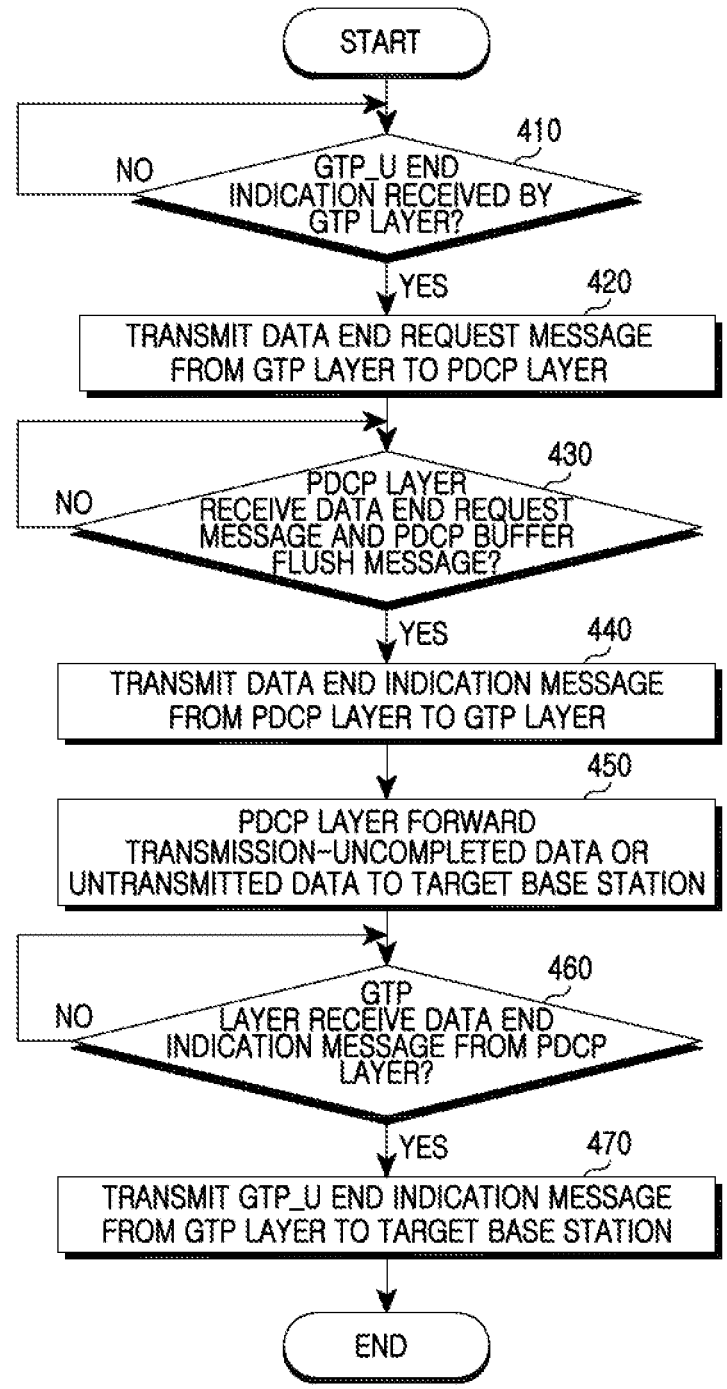
FIG. 4 is a flowchart illustrating an operation process of a source base station according to an exemplary embodiment of the present invention.

FIG. 4 is a flowchart illustrating an operation process of a source base station according to an exemplary embodiment of the present invention.

Referring to FIG. 4, when receiving the GTP_U end indication message in step 410, a GTP layer of the source base station transfers a data end request message to a PDCP layer of the source base station to inform of no more transmission of user data in step 420.

The PDCP layer receives a data end request message indicating the last data from the GTP layer, receives a PDCP buffer flush indication message from a control block in step 430, and transmits a data end indication message indicating no more forward data to the GTP layer in step 440.

The PDCP layer performs sequential forwarding through a GTP layer with respect to data among user data received from an EPC, which have not been transmitted to a user terminal and are stored in a buffer, and data that were received from the EPC and have not yet been transmitted to the user terminal in step 450.

When receiving the data end indication message in step 460, the GTP layer transmits a GTP_U end indication message to the target base station 230 in step 470.

Figure 5:
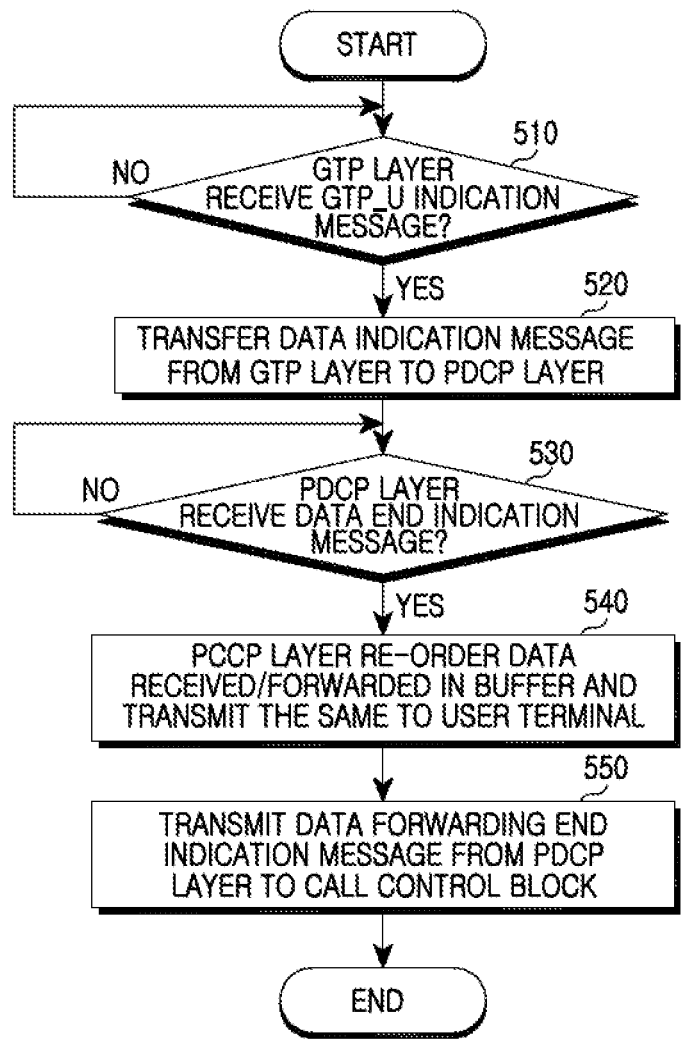
FIG. 5 is a flowchart illustrating an operation process of a target base station according to an exemplary embodiment of the present invention.

FIG. 5 is a flowchart illustrating an operation process of a target base station according to an exemplary embodiment of the present invention.

Referring to FIG. 5, when receiving a GTP_U end indication message in step 510, the GTP layer of the target base station transmits a data end indication message to the PDCP layer of the target base station to inform of no more forward data in step 520.

Thereafter, when receiving a data end indication message in step 530, the PDCP layer re-orders data received/forwarded in a buffer until the reception of the data end indication message on the basis of a PDCP SN, and transmits the re-ordered data through an RLC layer to the user terminal in step 540.

At the same time, the PDCP layer transmits a data forwarding end indication message to a call control block in step 550 to inform of the completion of a data forwarding process, and deletes a GTP Tunnel ID (X2) generated for the data forwarding.

Figure 6:
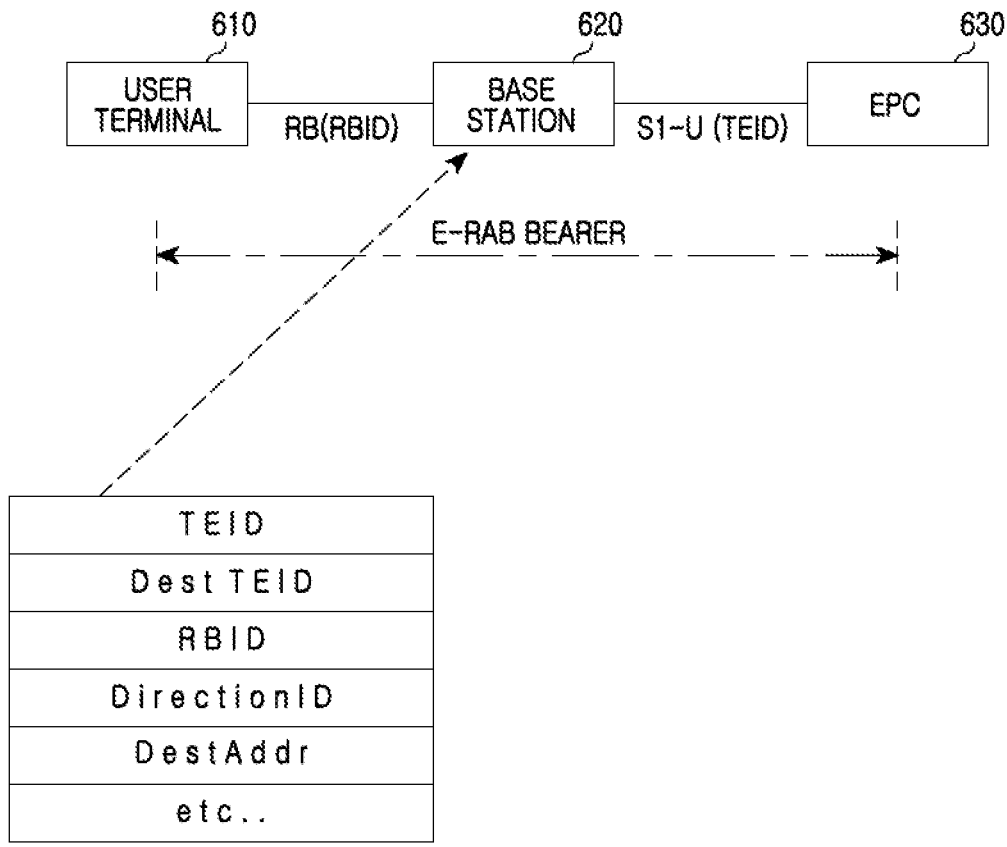
FIG. 6 is a diagram illustrating a traffic handling table according to an exemplary embodiment of the present invention.

In order to process user traffic data, the GTP layer of the base station constructs a traffic handling table at a call setup as illustrated in FIG. 6. The traffic handling table may be identification information on a specific link.

FIG. 6 is a diagram illustrating a traffic handling table according to an exemplary embodiment of the present invention.

Referring to FIG. 6, a basic structure of the traffic handling table has a mapping relationship of a GTP Tunnel ID in a S1-U interface between a base station 620 and an EPC 630 (or an X2-U interface between a source base station and a target base station in the case of a handover) and an RBID between a user terminal 610 and the base station 620.

Tunnel End Point ID (TEID) includes a local TEID that is allocated by a base station to receive user data from an opponent node through a GTP.

Destination TEID (Dest TEID) includes a TEID that is allocated by an opponent node to transmit user data from a base station to an opponent node (an EPC or a target base station), which is received by a base station through an S1-C or an X2-C and is stored and used at a call setup.

Radio Bearer ID (RBID) includes a Radio Bearer ID that is allocated for user data transmission between a user terminal and a base station at a call setup.

Direction INDicator (IND) includes information for discriminating between a basic call and a handover call in a GTP of a base station, where '0' is defined as an S1-U basic call, '1' is defined as downlink forwarding, and '2' is defined as uplink forwarding. Since the TEID allocated for data forwarding is allocated to the same RBID, it is used to discriminate between a basic call and a handover call.

Destination Address (Dest Addr) includes an IP address of an opponent node for transmission of user data.

In the case of uplink data transmission, a GTP layer extracts an RBID from data received from a PDCP layer, loads a dest TEID from a traffic handling table to construct a GTP header, and transmits the same to an opponent node.

In the case of downlink data transmission, a GTP layer extracts a (local) TEID from a GTP header of GTP data received from an opponent node, acquires an RBID from a traffic handling table to construct PDCP header information, and transmits the same to a PDCP.

When a GTP tunnel is set from a call control block of a base station at a call setup, a GTP layer constructs and manages a table for uplink and downlink traffic handling.

Flowcharts of an uplink/downlink data transmission process will be described below with reference to FIGS. 7 and 8.

Figure 7:
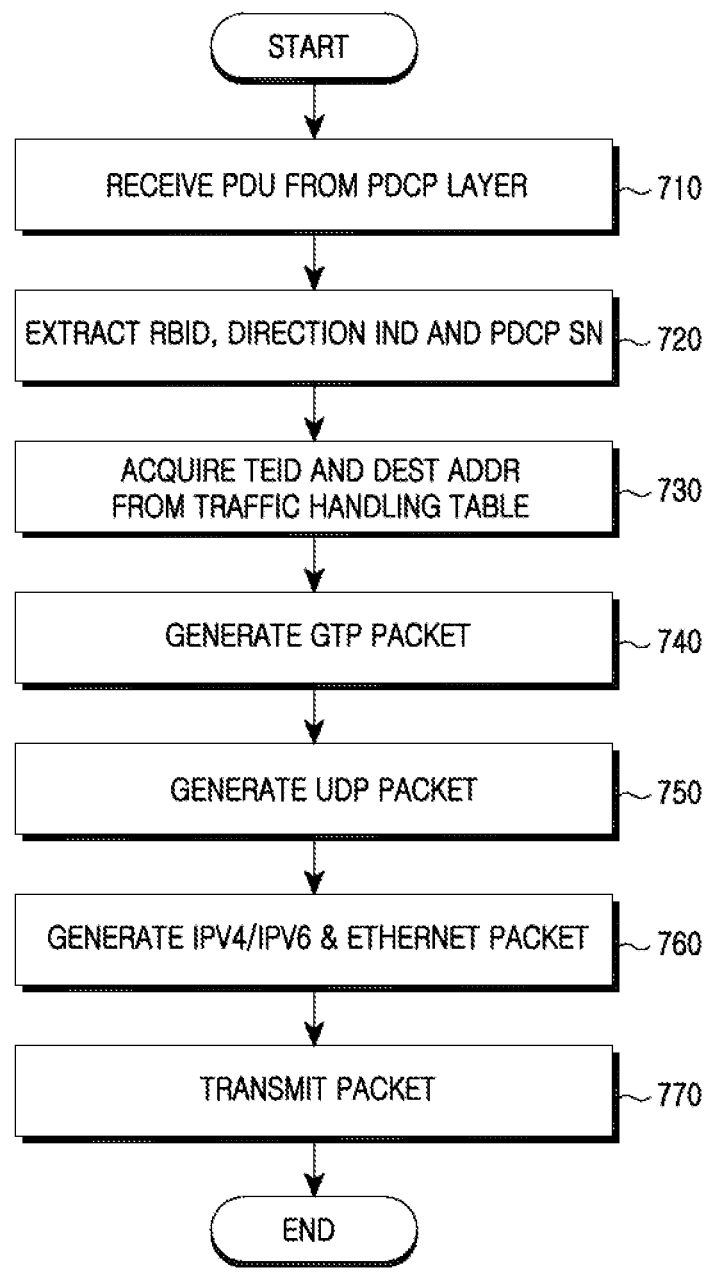
FIG. 7 is a flowchart illustrating an uplink data transmission process in a base station according to an exemplary embodiment of the present invention.

FIG. 7 is a flowchart illustrating an uplink data transmission process in a base station according to an exemplary embodiment of the present invention.

Referring to FIG. 7, when receiving a packet from a PDCP layer of the base station in step 710, a GTP layer of the base station extracts RBID and Direction IND information from the received packet in step 720 and acquires a dest TEID from a traffic handling table in step 730.

Thereafter, for GTP PDU transmission to an opponent node, the GTP layer uses the acquired TEID to encapsulate a GTP header and user data received from the PDCP layer. That is, it generates a GTP packet in step 740.

If the value of a Direction IND indicating a handover, among the data received from the PDCP layer, is '1' and a PDCP SN is present in the data received from the PDCP layer, the received PDCP SN information is set in an Extension Header Type of the GTP header. Herein, an Extension Header Flag of the GTP header is set to '1'. The Next Extension Header Type is set to an EH_PDCP_PDU_NUM (0xC0).

An extension header information structure is set to Length 1 (4 bytes), contents are set to received PDCP SN (2 bytes), and the next extension header type is set to NO_MORE_EH ('0'). Herein, in the case of a basic call for an S1-U (i.e., if a PDCP SN value is not set), an Option Header Flag (i.e., an 'S', 'E' and 'PN' flag) is set to '0', an Option Header Field (4 bytes) is not set, and user data are packed immediately after a Mandatory GTP Header (8 bytes).

Thereafter, User Datagram Protocol (UDP) information is set after the GTP header construction in step 750. A source/destination port is set to a general port 2152.

Thereafter, IP address information is set (one of IPv4/IPv6 is selected) and Ethernet information is set in step 760. Thereafter, a check sum operation is performed and it is transmitted to an opponent node in step 770. Herein, a destination IP address uses destination address information of a traffic handling table.

Figure 8:
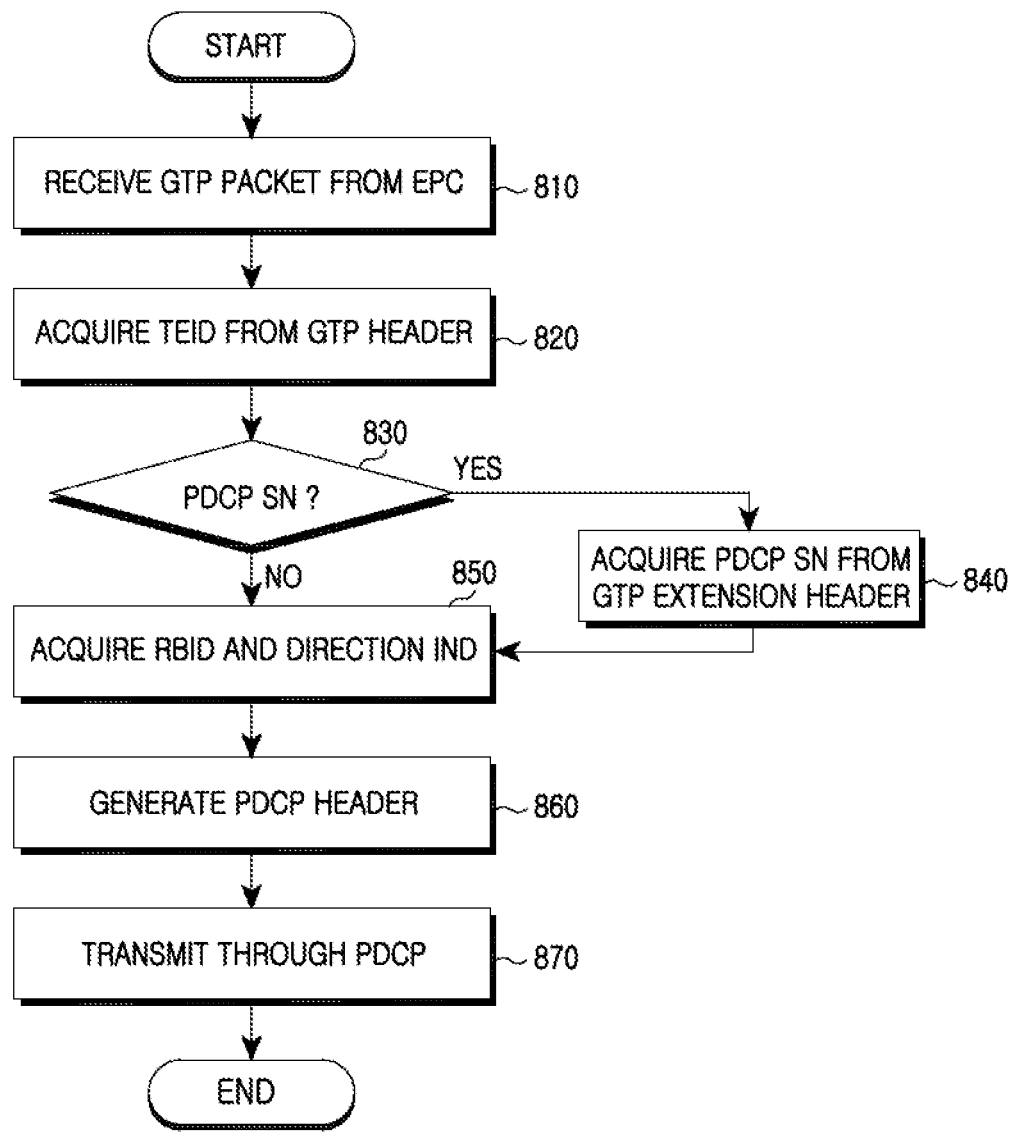
FIG. 8 is a flowchart illustrating a downlink data transmission process in a base station according to an exemplary embodiment of the present invention.

FIG. 8 is a flowchart illustrating a downlink data transmission process in a base station according to an exemplary embodiment of the present invention.

Referring to FIG. 8, when receiving a GTP-U message from an opponent node (EPC) in step 810, a GTP layer detects a message type of received user data, and if the message type is G-PDU (254), decapsulates a GTP packet to a (local) TEID in step 820. Then, the GTP layer determines an extension header flag to determine whether a PDCP SN of an extension header type is present in step 830.

If it is determined in step 830 that the PDCP SN is present (corresponding to a target base station as the case of handover—uplink/downlink forwarding), the GTP layer acquires the PDCP SN in step 840. Thereafter, it extracts RBID and Direction IND for TEID from a traffic handling table in step 850.

Thereafter, the GTP layer constructs a message to be transmitted to a PDCP layer, including the PDCP SN information. That is, it constructs a PDCP header to complete a PDCP packet in step 860 and transmits the same in step 870.

The above operation is an operation for a handover, which is the case of receiving a G_PDU end indication (254) from an opponent node as described above.

In contrast, if it is determined in step 830 that the PDCP SN is not present, the GTP layer acquires RBID and Direction IND for TEID from a traffic handling table in step 850. Thereafter, the GTP layer constructs a message to be transmitted to a PDCP layer. That is, it constructs a PDCP header to complete a PDCP packet in step 860 and transmits the same in step 870.

The above operation is an operation for a handover, which is the case of receiving a G_PDU end indication (254) from an opponent node as described above.

Figure 9:
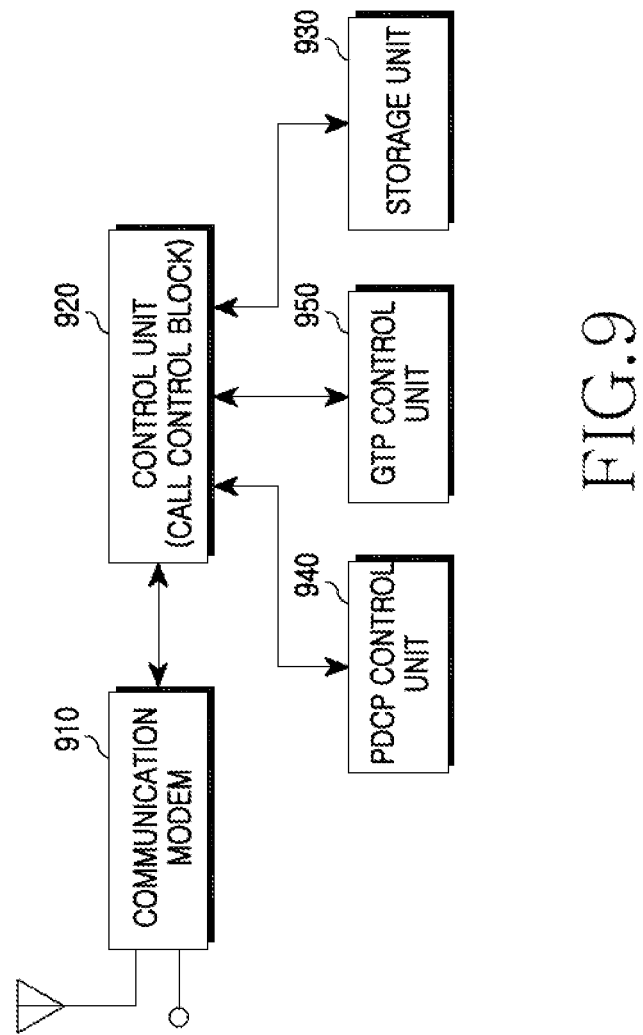
FIG. 9 is a block diagram of a network device according to an exemplary embodiment of the present invention.

FIG. 9 is a block diagram of a network device according to an exemplary embodiment of the present invention.

Referring to FIG. 9, the network device includes a communication modem 910, a control unit 920, a storage unit 930, a PDCP control unit 940, and GTP control unit 950.

The communication modem 910 is a module for communicating with another node. The communication model 910 includes a wireless processing unit (not shown) and a wireless baseband processing unit (not shown). The wireless processing unit converts a signal received through an antenna into a baseband signal and provides the baseband signal to the wireless baseband processing unit. Also, the wireless processing unit converts a baseband signal received from the wireless baseband processing unit into a wireless signal and transmits the wireless signal through the antenna. If the network device does not perform wireless communication, the wireless processing unit and the wireless baseband processing unit may be omitted.

If the network device performs wired communication, it includes a wired processing unit (not shown) and a wired baseband processing unit (not shown). The wired processing unit converts a signal received through a wired channel into a baseband signal and provides the baseband signal to the wired baseband processing unit. Also, the wired processing unit converts a baseband signal received from the wired baseband processing unit into a wired signal and transmits the wired signal through the wired channel.

The control unit 920 controls overall operations of the network device.

The storage unit 930 stores a program for controlling overall operations of the network device and temporary data generated during the program execution.

A configuration of a serving gateway will be described below with reference to FIG. 9.

When receiving a user plane update request message, the control unit 920 transmits a GTP_U end indication message to a source base station to inform of this. Thereafter, the control unit 920 does not transmit user data to the source base station anymore and transmits user data of a user terminal to a target base station.

A configuration of a source base station will be described below with reference to FIG. 9.

The control unit 920 controls overall operations of the source base station. According to an exemplary embodiment of the present invention, the control unit 920 controls the PDCP control unit 940 and the GTP control unit 950.

When receiving a GTP_U end indication message, the GTP control unit 950 transfers a data end request message to the PDCP control unit 940 to inform of no more transmission of user data.

When receiving a data end request message indicating the last data from the GTP control unit 950 and receiving a PDCP buffer flush indication message from the control unit 920, the PDCP control unit 940 transmits a data end indication message indicating no more forward data to the GTP control unit 950.

The PDCP control unit 940 performs sequential forwarding through the GTP control unit 950 with respect to data among user data received from an EPC, which have not been transmitted to a user terminal and are stored in a buffer, and data that were received from the EPC and have not yet been transmitted to the user terminal.

When receiving the data end indication message, the GTP control unit 950 transmits a GTP_U end indication message to a target base station.

In the above-described configuration, the control unit 920 may also perform the operations of the PDCP control unit 940 and the GTP control unit 950.

Although separate units are provided for respective functions of the control unit 920, the control unit 920 may perform all or some of the operations on behalf of such separate units.

A configuration of a target base station will be described below with reference to FIG. 9.

When receiving a GTP_U end indication message, the GTP control unit 950 transmits a data end indication message to the PDCP control unit 940 to inform of no more forward data.

When receiving a data end indication message, the PDCP control unit 940 re-orders data received/forwarded in a buffer until the reception of the data end indication message on the basis of a PDCP SN, and transmits the re-ordered data through an RLC layer to a user terminal.

At the same time, the PDCP control unit 940 transmits a data forwarding end indication message to the control unit 920 to inform of the completion of a data forwarding process, and deletes a GTP Tunnel ID (X2) generated for the data forwarding.

In the above-described configuration, the control unit 920 may also perform the operations of the PDCP control unit 940 and the GTP control unit 950.

Although separate units are provided for respective functions of the control unit 920, the control unit 920 may perform all or some of the operations on behalf of such separate units.

A configuration of a base station for an uplink/downlink data transmission process in a GTP layer will be described below with reference to FIG. 9. The storage unit 930 stores a traffic handling table. First, a description will be given of the uplink case.

When receiving a packet from the PDCP control unit 940, the GTP control unit 950 extracts RBID and Direction IND information from the received packet and acquires a dest TEID from a traffic handling table. Thereafter, for GTP PDU transmission to an opponent node, the GTP control unit 950 uses the acquired TEID to encapsulate a GTP header and user data received from the PDCP control unit 940. That is, the GTP control unit 950 generates a GTP packet.

If the value of a Direction IND indicating a handover, among the data received from the PDCP control unit 940, is '1' and a PDCP SN is present in the data received from the PDCP control unit 940, the GTP control unit 950 sets the received PDCP SN information in an Extension Header Type of the GTP header. Herein, an Extension Header Flag of the GTP header is set to '1'. The Next Extension Header Type is set to an EH_PDCP_PDU_NUM (0xC0).

An extension header information structure is set to Length 1 (4 bytes), contents are set to received PDCP SN (2 bytes), and the next extension header type is set to NO_MORE_EH ('0').

Herein, in the case of a basic call for an S1-U (i.e., if a PDCP SN value is not set), an Option Header Flag (i.e., an 'S', 'E' and 'PN' flag) is set to '0', an Option Header Field (4 bytes) is not set, and user data are packed immediately after a Mandatory GTP Header (8 bytes).

The control unit 920 sets UDP information after the GTP header construction. A source/destination port is set to a general port 2152.

The control unit 920 sets IP address information (one of IPv4/IPv6) and Ethernet information. Thereafter, the control unit 920 performs a check sum operation and transmits it to an opponent node through the communication modem 910. Herein, a destination IP address uses destination address information of a traffic handling table.

A description will now be given of the downlink case.

When receiving a GTP-U message from an opponent node (e.g., an EPC), the GTP control unit 950 detects a message type of received user data, and if the message type is G-PDU (254), decapsulates a GTP packet to a (local) TEID. Then, the GTP control unit 950 determines an extension header flag to determine whether a PDCP SN of an extension header type is present.

If it is determined that the PDCP SN is present (corresponding to a target base station as the case of handover—uplink/downlink forwarding), the GTP control unit 950 acquires the PDCP SN. Thereafter, it extracts RBID and Direction IND for TEID from a traffic handling table. If it is determined that the PDCP SN is not present, the GTP control unit 950 extracts RBID and Direction IND for TEID from a traffic handling table.

Thereafter, the GTP control unit 950 constructs a message to be transmitted to a PDCP layer, including the PDCP SN information. The above operation is an operation for a handover, which is the case of receiving a G_PDU end indication (254) from an opponent node as described above.

As described above, the exemplary embodiments of the present invention use an additional indication for indicating the completion of transmission of all necessary transmission data for a handover in a mobile communication system, thus making it possible to efficiently transmit user data without causing packet loss and delay.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A source base station in a communication system, the source base station comprising:
    a control unit which is a hardware element, configured to:
        receive a first message, indicating no more data of a user terminal to be transmitted, from a gateway,
        forward data of the user terminal to a target base station,
        transmit a second message, indicating completion of the forwarding, to the target base station,
        transfer, when receiving the first message, a data end request message from a tunneling layer of the source base station to a Packet Data Control Protocol (PDCP) layer of the source base station to inform of no more transmission of the data of the user terminal, and
        perform sequential forwarding through the tunneling layer with respect to data among the data of the user terminal received from the gateway, which have not been transmitted to the user terminal and are stored in a buffer, and data that were received from the gateway and have not yet been transmitted to the user terminal in the PDCP layer,
        transmit a data end indication message indicating no more data to be forwarded, from the PDCP layer to the tunneling layer when receiving the data end request message from the tunneling layer and receiving a PDCP buffer flush indication message from a control block, and
        transmit a second message to the target base station when receiving the data end indication message in the tunneling layer.

2. The source base station of claim 1, wherein the first and second messages comprise a field which is set to a value defined for an end indication for data forwarding.

3. The source base station of claim 1, wherein the first message is received through a first layer, and
wherein the first message indicates no more data for a second layer.

4. A method for operating a source base station in a communication system, the method comprising:
receiving a first message, indicating no more data of a user terminal to be transmitted, from a gateway;
forwarding data of the user terminal to a target base station; and
transmitting a second message, indicating completion of the forwarding, to the target base station,
wherein receiving the first message comprises:
transferring, when receiving the first message, a data end request message from a tunneling layer of the source base station to a Packet Data Control Protocol (PDCP) layer of the source base station to inform of no more transmission of the data of the user terminal;
performing sequential forwarding through the tunneling layer with respect to data among the data of the user terminal received from the gateway, which have not been transmitted to the user terminal and are stored in a buffer, and data that were received from the gateway and have not yet been transmitted to the user terminal in the PDCP layer; and
transmitting a data end indication message indicating no more data to be forwarded, from the PDCP layer to the tunneling layer when receiving the data end request message from the tunneling layer and receiving a PDCP buffer flush indication message from a control block, and
wherein transmitting the second message comprises transmitting a second message to the target base station when receiving the data end indication message in the tunneling layer.

5. The method of claim 4, wherein the first and second messages comprise a field which is set to a value defined for an end indication for data forwarding.

6. The method of claim 4, wherein the first message is received through a first layer, and
wherein the first message indicates no more data for a second layer.

7. An apparatus of a base station for uplink or downlink transmission in a communication system, the apparatus comprising:
a control unit, which is a hardware element, configured to:
acquire identification information on a first link with respect to a packet received on the first link,
acquire identification information on a second link mapped to the identification information on the first link,
if the packet includes information indicating data forwarding for handover of a user terminal, generate a tunneling packet, and
transmit the tunneling packet to a corresponding opponent node using the identification information on the second link; and
a storage unit configured to store the identification information on the first link and the identification information on the second link,
wherein a header of the tunneling packet comprises a sequence number of an encapsulated packet, and each of the first link and the second link is a link between the base station and the opponent node,
wherein, for uplink transmission, a General Packet Radio Service (GPRS) Tunneling Protocol (GTP) layer of the processor extracts handover indication information and identification information on one of at least one wireless link from a packet received on the one of the at least one wireless link received from a Packet Data Control Protocol (PDCP) layer of the processor, acquires a destination Tunnel Endpoint IDentifier (TEID) on one of at least one wired link from a traffic handling table and encapsulates a GTP header using a TEID, corresponding to a packet received for GTP Packet Data Unit (PDU) transmission, to complete a GTP packet, and
wherein if PDCP Sequence Number (SN) information is present and handover indication information is set in the packet received from the PDCP layer, the GTP layer sets PDCP SN information in an Extension Header Type of a GTP header to complete the GTP packet.

8. The apparatus of claim 7, wherein the processor is further configured to:
complete the completed GTP packet into an Internet Protocol (IP) packet, and
transmit the IP packet to an opponent node, and
wherein a destination IP in the IP packet is acquired from the traffic handling table.

9. The apparatus of claim 7, wherein the PDCP SN information is included for one of handover and forwarding.

10. The apparatus of claim 7, wherein the PDCP SN information is included for one of handover and forwarding.

11. The apparatus of claim 7, wherein, for downlink transmission, a GTP layer of the processor detects, when receiving a packet of a wired link from an opponent node, a message type from the received packet to decapsulate the received packet to acquire a Tunnel Endpoint IDentifier (TEID), determines an extension header of the received packet, and, if it is determined that Packet Data Control Protocol (PDCP) Sequence Number (SN) information is present in the extension header, uses the PDCP SN information to acquire a PDCP SN and acquire handover indication information and a Radio Bearer ID (RBID) for a TEID from the traffic handling table; and
the GTP layer completes a packet including the PDCP SN information and provides the same to a PDCP layer of the processor.

12. A method for uplink or downlink transmission in a mobile communication system, the method comprising:
acquiring identification information on a first link with respect to a packet received on the first link;
acquiring identification information on a second link mapped to the identification information on the first link;
generating a tunneling packet, if the packet includes information of indicating data forwarding for handover of a user terminal;
transmitting the tunneling packet to a corresponding opponent node using the identification information on the second link; and
storing the identification information on the first link and the identification information on the second link,
wherein, for uplink transmission, a General Packet Radio Service (GPRS) Tunneling Protocol (GTP) layer of a processor extracts handover indication information and identification information on one of at least one wireless link from a packet received on the wireless link received from a Packet Data Control Protocol (PDCP) layer of the processor, acquires a destination Tunnel Endpoint IDentifier (TEID) on one of at least one wired link from a traffic handling table and encapsulates a GTP header using a TEID, corresponding to a packet received for GTP Packet Data Unit (PDU) transmission, to complete a GTP packet, wherein a header of the tunneling packet comprises sequence number of a encapsulated packet, and each of the first link and the second link is a link between the base station and the opponent node, wherein if PDCP Sequence Number (SN) information is present and handover indication information is set in the packet received from the PDCP layer, the GTP layer sets PDCP SN information in an Extension Header Type of a GTP header to complete the GTP packet.

13. The method of claim 12, wherein, for uplink transmission, the processor is further configured to:
complete the completed GTP packet into an Internet Protocol (IP) packet, and
transmit the IP packet to an opponent node, and
wherein a destination IP address in the IP packet is acquired from the traffic handling table.

14. The method of claim 12, wherein for uplink transmission, the PDCP SN information is included for one of handover and forwarding.

15. The method of claim 12, wherein for downlink transmission, the PDCP SN information is included for one of handover and forwarding.

16. The method of claim 12, wherein for downlink transmission, a GTP layer of a processor detects, when receiving a packet of a wired link from an opponent node, a message type from the received packet to decapsulate the received packet to acquire a Tunnel Endpoint IDentifier (TEID), determines an extension header of the received packet, and, if it is determined that Packet Data Control Protocol (PDCP) Sequence Number (SN) information is present in the extension header, uses the PDCP SN information to acquire a PDCP SN and acquire handover indication information and a Radio Bearer ID (RBID) for a TEID from the traffic handling table; and
the GTP layer completes a packet including the PDCP SN information and provides the same to a PDCP layer of the processor.

17. A target base station in a communication system, the target base station comprising:
a control unit, which is a hardware element, configured to receive a message, indicating completion of forwarding, from a source base station; and
a transmitter configured to transmit data forwarded from the source base station to a user terminal, wherein the control unit is further configured to:
transfer, when receiving the message, a data end indication message from a tunneling layer of the target base station to a Packet Data Control Protocol (PDCP) layer of the target base station to inform of no more forwarded data,
re-order, when receiving the data end indication message in the PDCP layer, data received/forwarded in a buffer until the reception of the data end indication message based on a PDCP Sequence Number (SN), and transmit the re-ordered data through a Radio Link Control (RLC) layer to the user terminal,
transmit a data forwarding end indication message to a call control block to inform of completion of a data forwarding process in the PDCP layer, and
delete a Tunnel IDentifier (ID) generated for data forwarding.

18. A method for operating a target base station in a communication system, the method comprising:
receiving a message indicating completion of forwarding of user terminal from a source base station; and
transmitting data forwarded from the source base station to the user terminal,
wherein receiving the message comprises:
transferring, when receiving the message, a data end indication message from a tunneling layer of the target base station to a Packet Data Control Protocol (PDCP) layer of the target base station to inform of no more forwarded data, and
wherein the transmitting of the data forwarded from the source base station to the user terminal comprises:
re-ordering, when receiving a data end indication message in the PDCP layer, data received/forwarded in a buffer until the reception of the data end indication message on a basis of a PDCP Sequence Number (SN), and transmitting the re-ordered data through a Radio Link Control (RLC) layer to the user terminal,
wherein the method further comprises transmitting a data forwarding end indication message to a call control block to inform of completion of a data forwarding process in the PDCP layer, and deleting a Tunnel IDentifier (ID) generated for data forwarding.

\* \* \* \* \*